United States Patent [19]

Hoogeboom

[11] 3,880,799

[45] Apr. 29, 1975

[54] THERMAL OXIDATIVELY STABLE POLYCARBONATE

[75] Inventor: Thomas J. Hoogeboom, Evansville, Ind.

[73] Assignee: General Electric Company, Pittsfield, Mass.

[22] Filed: Jan. 2, 1974

[21] Appl. No.: 429,571

Related U.S. Application Data

[63] Continuation-in-part of Ser. No. 320,567, Jan. 2, 1973, abandoned.

[52] U.S. Cl. ... 260/45.7 P; 260/45.8 A; 260/47 XA
[51] Int. Cl. ............................................ C08d 11/04
[58] Field of Search ...... 260/47 XA, 45.7 P, 45.8 A

[56] References Cited
UNITED STATES PATENTS

| | | | |
|---|---|---|---|
| 3,489,716 | 1/1970 | Calkins | 260/45.8 A |
| 3,578,634 | 5/1971 | Bialous et al. | 260/47 XA |
| 3,634,312 | 1/1972 | Babillis et al. | 260/45.8 A |
| 3,711,441 | 1/1973 | Liberti | 260/47 XA |

*Primary Examiner*—Melvyn I. Marquis
*Attorney, Agent, or Firm*—William F. Mufatti; Donald M. Papuga

[57] ABSTRACT

A thermal oxidatively stable polycarbonate composition having a stabilizing amount of an ester of a phosphorohalidous acid and a process for preparing a thermal oxidatively stable polymer. In the process, the ester of a phosphorohalidous acid is reacted with a dihydric-phenol monomer. In addition, an epoxy may be used in admixture with the composition.

7 Claims, No Drawings

THERMAL OXIDATIVELY STABLE POLYCARBONATE

This application is a continuation-in-part of U.S. Patent application Ser. No. 320,567, filed Jan. 2, 1973, and now abandoned.

This invention relates to thermal oxidatively stable polycarbonate compositions and more particularly to polycarbonate compositions having stabilizing amounts of particular phosphorus-containing compounds reacted in the polymer chain and to a process for preparing the thermal oxidatively stable polymers.

BACKGROUND OF THE INVENTION

While it is known to incorporate phosphorus into a polymer chain as disclosed in U.S. Pat. No. 3,378,523 and in the publication by G. S. Kolesnikov et al. found in Vysokomol-soyed.A9; No. 10, pages 2246–2249, 1947, none of these references disclose the use of stabilizing amounts of particular phosphorus-containing materials to be incorporated into the polymer chain to achieve greatly enhanced thermal stability. Due to the use of increased molding temperatures with polycarbonates and the exposure of molded polycarbonate shapes to higher use temperatures, it is increasingly more important to provide polycarbonates having increased stability to thermal degradation or discoloration due to elevated temperatures.

Therefore, it has been surprisingly discovered that by incorporating stabilizing amounts of a particular phosphorus-containing material into the polymer chain, thermally stable polycarbonates are obtained.

Therefore, it is an object of the instant invention to provide a thermally stable polycarbonate.

Another object of this invention is to provide a thermally stable polycarbonate having stabilizing amounts of a particular phosphorus incorporated into the polymer chain which can act as a chain stopper.

Still another object of this invention is to provide a process for preparing a thermally stable polycarbonate.

Yet another object of this invention is to provide a thermally stable polycarbonate composition having an epoxy compound in admixture with the particular polycarbonate.

These and other objects of this invention will become apparent from the following detailed description thereof.

DESCRIPTION OF THE INVENTION

According to this invention, the foregoing and other objects are attained by reacting a dihydric phenol such as 2,2-bis(4-hydroxyphenol) propane (hereinafter referred to as bisphenol-A), a carbonate precursor and a minor amount of an ester of a phosphorohalidous acid as represented by the formula:

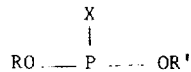

wherein X is a halogen atom selected from the group consisting of bromine and chlorine and R and R' are consisting of aryl, haloaryl, alkyl, cycloalkyl, aralkyl and alkaryl radicals. These radicals preferably contain from 1 to about 25 carbon atoms. Also, these radicals may contain those substituents known in the art. In addition, the above polymer may have in admixture therewith a particular epoxy compound.

The polymer of the instant application can be represented by the following formula:

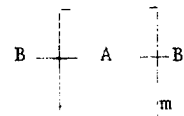

wherein A is

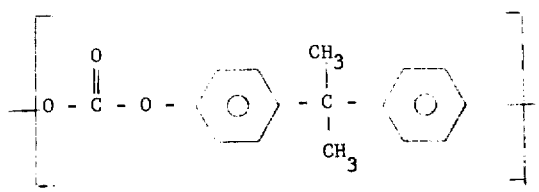

and wherein B is

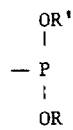

R and R' are as defined previously and $m$ is about 5 to 10,000.

DESCRIPTION OF THE PREFERRED EMBODIMENT

The following examples are set forth to illustrate more clearly the principal and practice of this invention to those skilled in the art. Unless otherwise specified, where parts or percents are mentioned, they are parts or percents by weight.

EXAMPLE I

To a reactor fitted with a reflux condenser and mechanical agitator, charge 76 kg. of methylene chloride, 9.53 kg. of 2,2-bis(4-hydroxyphenly) propane, 8.5 kg. of calcium hydroxide, 0.188 kg. of p-tertiarybutylphenol, and 4.7 ml. of triethylamine. The slurry is stirred and phosgene is added at a rate of about 6.0 kg. per hour. Ater 48 minutes, the phosgene addition is terminated. The polycarbonate is recovered in solid form by filtering and evaporation of the solvent. The polycarbonate is dried overnight at 125°C and then extruded at a temperature of about 525°F. The extrudate is comminuted into pellets.

The polycarbonate pellets are designated as Sample A.

EXAMPLE II

To a reactor fitted with a reflux condenser and mechanical agitator, charge 76 kg. methylene chloride, 9.53 kg. of 2 2-bis(4-hydroxyphenyl) propane, 8.5 kg. calcium hydroxide, 0.188 kg. of p-tertiarybutylphenol, and 4.7 ml. of triethylamine. The slurry is stirred and 8.2 g. of diphenyl phosphorochloridite is added, followed by addition of phosgene gas at a rate of about 6.0 kg./hour. After 45 minutes, the phosgene addition is terminated. The polycarbonate is recovered and pelletized as in Example I.

Elemental phosphorus content of the polycarbonate is determined by the Schoniger combustion test described in Identification and Analysis of Plastics by Haslum and Willis, Iliffe Books, London, 1965, p. 8. Elemental phosphorus content is found to be 0.0091 weight percent.

The polycarbonate pellets are designated as Sample B.

EXAMPLE III

Example II is repeated except that 20.4 g. of diphenyl phosphorochloridite is used herein instead of 8.2 g. thereof.

Elemental phosphorus content is found to be 0.0230 percent.

The polycarbonate pellets are designated as Sample C.

EXAMPLE IV

Each of the polycarbonate pellets of Examples I-III are molded into test samples at the termperature so indicated in Table 1. Thermal stability to discoloration is measured using the IDL color eye colorimeter in terms of APHA numbers (Americal Public Health Association). The results are as follows:

TABLE 1

| SAMPLE | WT. % P | APHA 550°F | 600°F |
|---|---|---|---|
| A | 0 | 62 | 66 |
| B | 0.0091 | 24 | 24 |
| C | 0.0230 | 19 | 19 |

EXAMPLE V

Example IV is repeated except that 0.1% of 3,4-epoxycyclohexylmethyl-3,4-epoxycyclohexane carboxylate is blended with the polycarbonate pellets. The B and C samples are molded at the temperatures so indicated in Table 2. The samples are heat aged for 7 days at 140°C. The samples are then measured for thermal stability to discoloration by the same test procedure employed in Example IV. The results are as follows:

TABLE 2

| SAMPLE | WT.% P | HEAT-AGED APHA 550°F | 600°F |
|---|---|---|---|
| A | 0 | 117 | 152 |
| B | 0.0091 | 39 | 41 |
| C | 0.0230 | 30 | 32 |

EXAMPLE VI

To a reactor fitted with reflux condenser and mechanical agitator, charge 57.1 g. 2,2-bis(4-hydroxyphenyl) propane, 53.2 g. calcium hydroxide, 340 ml. methylene chloride, and 30 ml. triethylamine. While stirring, 0.63 g. diphenyl-phosphorochloride (1.0 mole %) is added as the chain terminator Phosgene gas is then metered in at about 0.64 g/min. After about 45 minutes, phosgene addition is terminated. The polycarbonate is recovered in solid form by filtration and evaporation of the solvent. The intrinsic viscosity of the resulting polymer is determined according to the procedure described in Experimental Physical Chemistry, Daniels, Mathews, Williams, Bender, and Alberty, McGraw-Hill Book Company, Inc., New York, 1956, p. 216 using an Ubbelohde viscometer. The intrinsic viscosity is 1.25 dl/g.

EXAMPLE VII

Example VI is repeated except that 1.25 g. (2.0 mole %) of diphenylphosphorochloridite is used herein as the chain terminator instead of 0.63 g. thereof. The intrinsic viscosity, measured as in Example VI, is 0.78 dl/g.

EXAMPLE VIII

Example VI is repeated except that 2.50 g. (4.0 mole %) of diphenylphosphorochloridite is used herein as the chain terminator instead of 0.63 g. thereof. The intrinsic viscosity, measured as in Example VI, is 0.510 dl/g.

The instant invention is directed to a thermally stable polymer composition and more particularly to a thermally stable polycarbonate having incorporated into the polymer structure an ester of a phosphorohalidous acid. The polymer herein set forth is the residue of the condensation reaction of a dihydric phenol preferably bisphenol-A, a carbonate precursor and a stabilizing amount of a reactant which is an ester of a phosphorohalidous acid as represented by the formula:

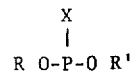

wherein the above formula, X is a halogen atom selected from the group consisting of bromine and chlorine, and R and R' are organic radicals independently selected from the group consisting of aryl, haloaryl, alkyl, cycloalkyl, aralkyl and arkaryl radicals. These radicals preferably contain from 1 to about 25 carbon atoms. In addition, the instant invention is directed to an improved process for preparing the polycarbonates, which process consists of preparing the thermal oxidatively stable polymer by reacting a dihydric phenol, a carbonate precursor, and a stabilizing amount of the ester of phosphorohalidous acid in an organic medium such as methylene chloride, and in the presence of a catalyst, a molecular weight regulator, and an acid acceptor. The amount of the ester of a phosphorohalidous acid to be reacted per mole of dihydric phenol is 0.000015 to about 0.05 mole thereof. Further, the invention is directed to admixing with the above polymer an epoxy composition as represented by the following formula:

I.
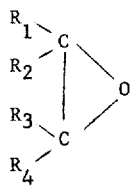

wherein $R_1$, $R_2$, $R_3$ and $R_4$ are independently selected from the group consisting of hydrogen, alkyl, cycloalkyl, aryl, substituted aryl and heterocyclic organic radicals wherein the organic radicals have a carbon content of 1 to 24 carbon atoms; and

II.

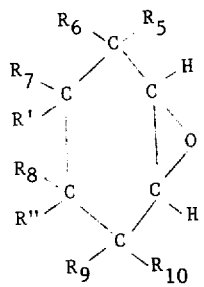

wherein $R_5$, $R_6$, $R_7$, $R_8$, $R_9$ and $R_{10}$ are independently selected from the group consisting of hydrogen, alkyl and substituted alkyl radicals of 1–24 carbon atoms and wherein the substituent on the alkyl radical can additionally include therein another oxirane ring, and further wherein R' and R'' are independently selected from the group consisting of hydrogen and —COOR; said R being selected from the group consisting of alkyl, substituted alkyl, cycloalkyl, substituted cycloalkyl and aryl radicals of 1–24 carbon atoms and wherein the substituent on the alkyl and cycloalkyl radicals can additionally include therein another oxirane ring. While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperatures employed in preparing molded articles from the composition of this invention.

The amount of epoxy employed in the practice of this invention is a stabilizing amount and can vary from 0.01 to 1.0 weight percent based on the weight of the polymer composition and is preferably 0.03 to 0.50 weight percent. While more than 1.0 weight percent of epoxy can be employed, it has been found that higher amounts tend to degrade the physical properties of the polycarbonate and thereby reduce the usefulness of the polymer in providing tough, flexible molded articles.

In the practice of this invention, other epoxy compounds that have been employed in place of the 3,4-epoxy-cyclohexylmethyl 3,4-epoxy cyclohexane carboxylate with essentially the same results as those set forth previously as encompassed by the formula I and II and are 3,4-epoxy-6-methylcyclohexylmethyl, 3,4-epoxy-6-methylcyclohexane carboxylate, 2,3-epoxycyclohexylmethyl 3,4-epoxycyclohexane carboxylate, 4-(3,4-epoxy-5-methylcyclohexyl) butyl 3,4-epoxycyclohexane carboxylate, 3,4-epoxycyclohexyl ethylene oxide, cyclohexylmethyl 3,4-epoxy-cyclohexane carboxylate, 3,4-epoxy-6-methylcyclohexylmethyl-6-methylcyclohexyl carboxylate, bisphenol-A diglycidyl ether, tetrabromobisphenol-A diglycidyl ether, diglycidyl ester of phthalic acid, diglycidal ester of hexahydrophthalic acid, bisepoxy dicyclopentadienyl ether of ethylene glycol, epoxidized soybean oil, epoxidized linseed oil, bisepoxycyclohexyl adipate, butadiene diepoxide, tetraphenylethylene epoxide, octyl epoxy tallate and epoxidized polybutadiene. Also, 3,4-dimethyl-1,2-epoxy cyclohexane, 3,5-dimethyl-1,2-epoxy cyclohexane, 3-methyl-5-tert butyl-1,2-epoxy cyclohexane, octadecyl 2,2-dimethyl-3,4-epoxy cyclohexane carboxylate, N-butyl 2,2-dimethyl-3,4-epoxy cyclohexane carboxylate, cyclohexyl 2-methyl-3,4-epoxy cyclohexane carboxylate, N-butyl 2-isopropyl-3,4-epoxy-5-methylcyclohexane carboxylate, octadecyl-3,4-epoxy cyclohexane carboxylate, 2 ethyl hexyl 3',4'-epoxy cyclohexane carboxylate, 4,6 dimethyl 2,3 epoxy cyclohexyl 3',4'-epoxy cyclohexane carboxylate, 4,5-epoxytetrahydro phthalic-anhydride, 3-tert butyl 4,5-epoxytetrahydro phthalic anhydride, diethyl 4,5-epoxy-cis-1,2 cyclohexane dicarboxylate, di-n-butyl 3-tert butyl-4,5-epoxy-cis-1,2 cyclohexane dicarboxylate. Specifically, any of the epoxycyclohexyl compounds meet the general formula of II and the other epoxy compounds recited herein meet the general formula of I. Preferably, the epoxy compound employed in the practice of this invention is 3,4-epoxy cyclohexylmethyl 3,4-epoxy cyclohexane carboxylate.

The dihydric phenols that can be employed herein to prepare the copolymer of this invention are bisphenols such as bis(4-hydroxyphenyl) methane, 2,2-bis (4-hydroxyphenyl) propane, 2,2-bis(4-hydroxy-3-methylphenyl) propane, 4,4-bis(4-hydroxyphenyl) heptane, 2,2-bis(4-hydroxy 3,5-dichlorophenyl) propane, 2,2-bis(4-hydroxy 3,5-dibromophenyl) propane, etc., dihydric phenol ethers such as bis(4-hydroxyphenyl) ether, bis(3,5-dichloro-4-hydroxyphenol) ether, etc.; dihydroxydiphenols such as p,p-dihydroxyphenyl, 3,3'-dichloro-4,4'-dihydroxydiphenyl, etc. dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, bis-(3,5-dibromo-4-hydroxyphenyl) sulfoxide etc. A variety of additional dihydric phenols are also available to provide carbonate polymers and are disclosed in U.S. Pat. Nos. 2,999,835, 3,028,365 and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates of dihydric phenols (bischloroformate of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene, is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can be either an hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, paratertiarybutylphenol, parabromophenol, etc. Preferably, paratertiarybutylphenol is employed as the molecular weight regulator. Additionally, the esters of phosphorohalidous acid as represented above, can act as molecular weight regulators.

It will thus be seen that the objects set forth above among those made apparent from the preceding description are efficiently attained, and since certain changes may be made in carrying out the above process and in the composition set forth without departing from the scope of the invention, it is intended that all matters contained in the above description shall be interpreted as illustrative and not in a limiting sense.

What is claimed is:

1. A thermal oxidatively stable polymer composition which is the residue of the condensation reaction of a dihydric phenol, a carbonate precursor and 0.000015 to about 0.05 moles per mole of dihydric phenol of an ester of a phosphorohalidous acid having the following formula:

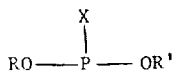

wherein X is a halogen atom selected from the group consisting of bromine and chlorine and R and R' are organic radicals independently selected from the group consisting of aryl haloaryl, alkyl cycloalkyl, aralkyl and alkaryl radicals.

2. The composition of claim 1 wherein the ester of phosphorohalidous acid is diphenyl phosphorochloridite.

3. The composition of claim 1 wherein the polymer composition has the following formula:

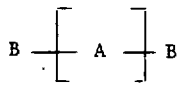

wherein A is

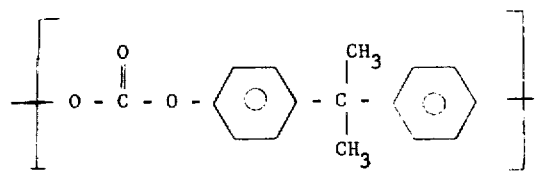

and wherein B is

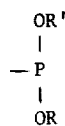

4. In a process for preparing a thermal oxidatively stable aromatic polycarbonate by reacting a dihydric phenol with a carbonate precursor in the presence of an acid acceptor, a catalyst and a molecular weight regulator; wherein the improvement comprises adding to the reaction 0.000015 to about 0.05 mole per mole of dihydric phenol of an ester of a phosphorohalidous acid having the following formula:

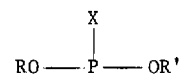

wherein X is a halogen atom selected from the group consisting of bromine and chlorine and R and R' are organic radicals independently selected from the group consisting of aryl, haloaryl, alkyl, cycloalkyl, aralkyl and alkaryl radicals.

5. The composition of claim 1 having in admixture therewith from 0.01 to 1.0 weight percent based on the weight of the polymer composition of an epoxy composition represented by the following formula:

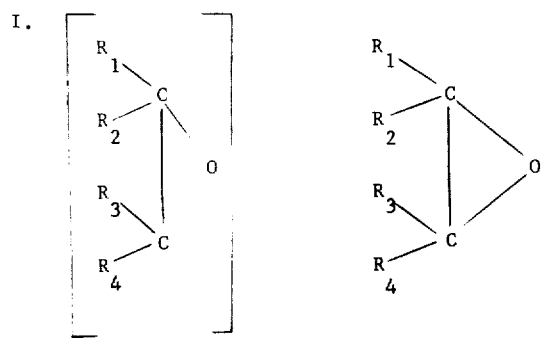

wherein $R_1$, $R_2$, $R_3$ and $R_4$ are independently selected from the group consisting of hydrogen, alkyl, cycloalkyl, aryl, substituted aryl and heterocyclic organic radicals wherein the organic radicals have a carbon content of 1 to 24 carbon atoms, and

II.

wherein $R_5$, $R_6$, $R_7$, $R_8$, $R_9$ and $R_{10}$ are independently selected from the group consisting of hydrogen, alkyl and substituted alkyl radicals of 1–24 carbon atoms and wherein the substituent on the alkyl radical can additionally include therein another oxirane ring; R' and R'' are independently selected from the group consisting of hydrogen and —COOR, wherein R is selected from the group consisting of alkyl, substituted alkyl, cycloalkyl, substituted cycloalkyl and aryl radicals of 1–24 carbon atoms and wherein the substituent on the alkyl and cycloalkyl radicals can additionally include therein another oxirane ring.

6. The composition of claim 4 wherein the epoxy compound is an epoxidized cycloaliphatic compound.

7. The composition of claim 4 wherein the epoxy compound is 3,4-epoxy-cyclohexylmethyl 3,4-epoxy cyclohexane carboxylate.

* * * * *